March 13, 1928.　　　　　　　　　　　　　　　　1,662,157
A. E. MAYNARD
LENS GRINDING MACHINE
Filed Feb. 14, 1925　　　　4 Sheets-Sheet 1

INVENTOR
Albert E. Maynard.
BY
Harry H. Styll
ATTORNEY

March 13, 1928.

A. E. MAYNARD 1,662,157

LENS GRINDING MACHINE

Filed Feb. 14, 1925   4 Sheets-Sheet 2

INVENTOR
Albert E. Maynard.
BY
Harry H. Styll
ATTORNEY

March 13, 1928. 1,662,157

A. E. MAYNARD

LENS GRINDING MACHINE

Filed Feb. 14, 1925 4 Sheets-Sheet 3

INVENTOR
Albert E. Maynard.
BY
Harry H. Styll
ATTORNEY

March 13, 1928. 1,662,157

A. E. MAYNARD

LENS GRINDING MACHINE

Filed Feb. 14, 1925 4 Sheets-Sheet 4

INVENTOR
Albert E. Maynard.
BY
Harry H. Styll
ATTORNEY

Patented Mar. 13, 1928.

1,662,157

UNITED STATES PATENT OFFICE.

ALBERT E. MAYNARD, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS-GRINDING MACHINE.

Application filed February 14, 1925. Serial No. 9,193.

This invention relate to improvements in lens edging machines, and has particular reference to machines adapted for finishing the edges of ophthalmic lenses preparatory to mounting them in frames.

Prior to my invention the edges of ophthalmic lenses have been finished by bevelling, in order to mount them in the rims of eyeglasses and spectacles, and in the bevelling operation the lenses have been so held in relation to a grindstone that the edges are bevelled equi-angularly with respect to the axis of the lens, and with the peak of the bevel approximately in the center of the lens edge. This is the desirable way to grind lenses. The average flat lens can be so ground with the machines in use heretofore, but when it comes to toric and meniscus lenses, by forming the apex of the bevel in the center of the lens edge a longer bevel is produced upon one side than upon the other and this is undesirable in setting the lenses in frames.

One of the principal objects of the invention is to produce an automatic edging machine wherein the edge of the lens will be presented to the grinding stone at an angle to the axis of the stone.

Another object is to provide such a device wherein the edge of a lens may be bevelled equi-angularly with respect to the surface curvatures.

Another object is to provide a grinding machine with a carriage which may be selectively adjusted angularly according to the surface curvature of the lens being operated upon.

A further object is to provide such a machine whereby equal bevels will be ground upon each side of the lens.

Still another object is to provide such a machine whereby the edges of all types of lenses may be bevelled equilaterally and equi-angularly in relation to the lens surfaces, by adjustment of the lens carriage to compensate for the lens shape.

Other objects and advantages will be apparent from the following description taken in connection with the accompanying drawings, wherein similar reference characters designate corresponding parts throughout the several views.

In the drawings forming a part of this application,

Figure 1:
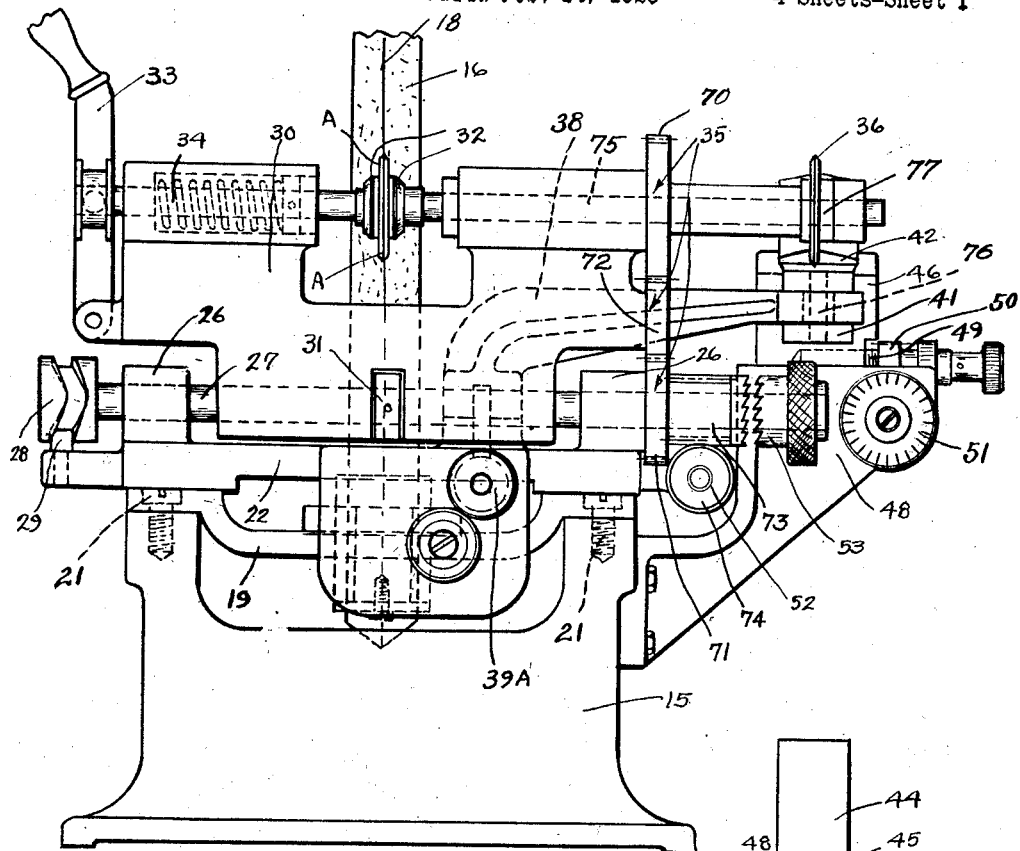
Figure 1 is a front elevation of an edge grinding machine embodying the invention.
Figure 2:
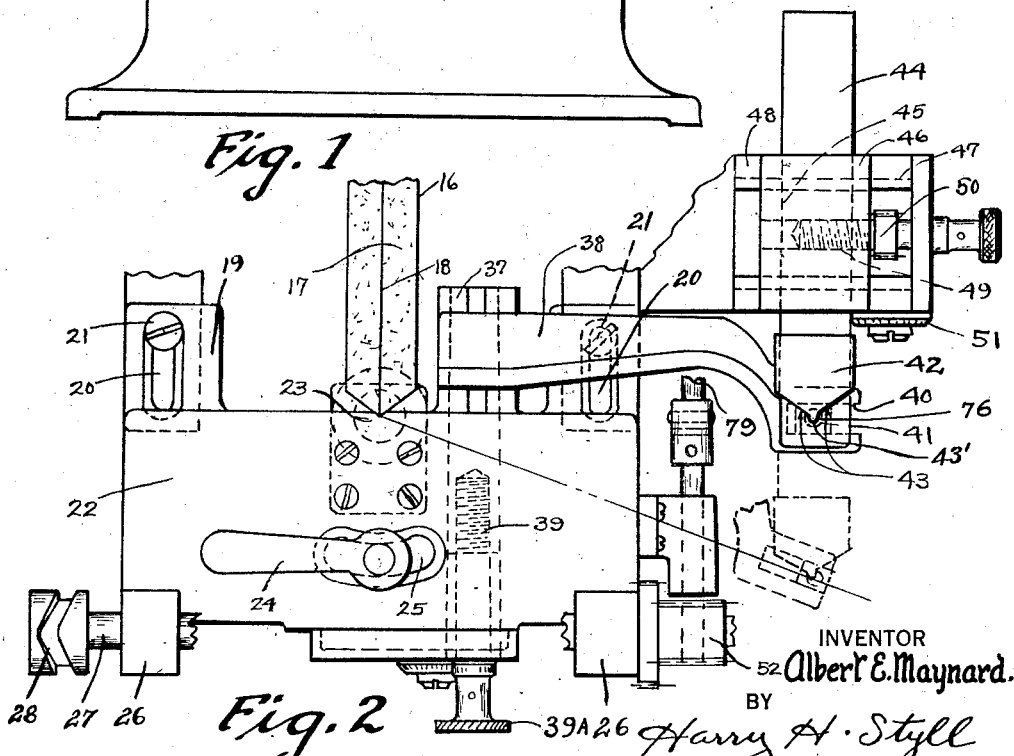
Figure 2 is a fragmentary top plan view thereof, parts being omitted.
Figure 3:
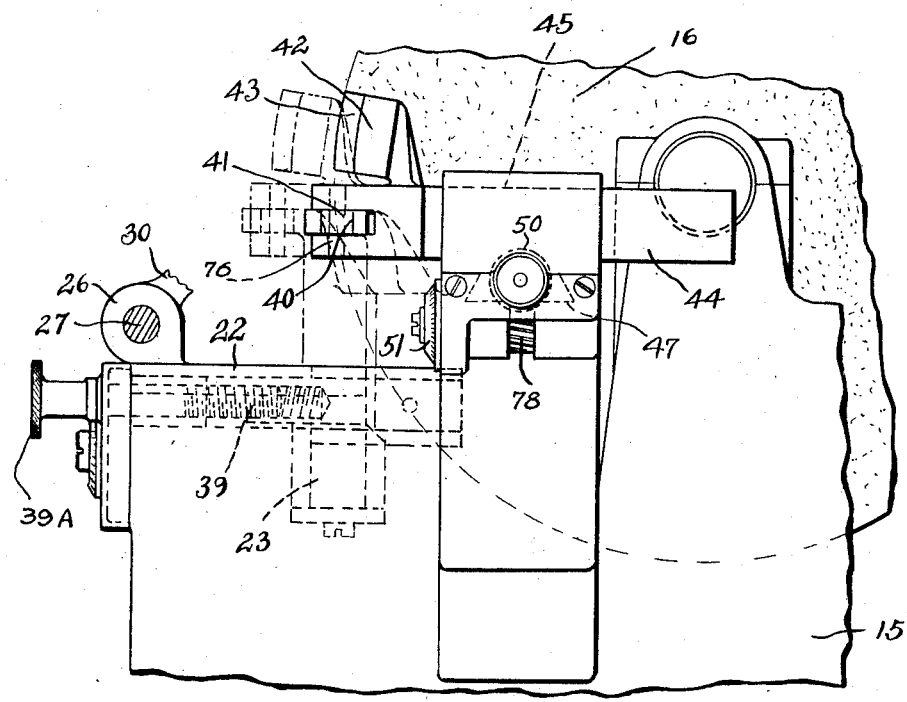
Figure 3 is a side elevation of the same structure.

Referring now particularly to Figures 1, 2 and 3, my improved edging machine comprises the usual base or tub 15, upon which is rotatably mounted an abrasive wheel 16 having on its periphery two angular surfaces 17 forming a peak 18 at their intersection. A plate 19 is mounted upon the base 15 and provided with slots 20 in which are disposed the fastening screws 21. This provides adjustment so that as the stone wears, the operative mechanism may be moved inwardly and maintained at its proper relationship, as will be clearly evident to those skilled in the art. A second plate or frame 22 is mounted above the plate 19 and pivoted thereto at 23, the center line of the pivot being tangent to the apex 18 of the beveled periphery of the wheel 16. The clamping member 24 serves to lock the frame 22 in adjusted position, said clamping member being slidable through the arcuate slot 25. The clamping member is supported by the plate 19 and extends through the slot 25 in the pivoted plate 22. The arcuate slot 25 in Fig. 2 is long enough to permit the swinging of the plate 22 to the desired extreme position. It is never adjusted to the position where the edge of the lens will be parallel to one of the surfaces 17 of the stone for the reason that it is used only for bevelling lenses and is swung to the angle of the required bevel.

On its upper surface the frame 22 is provided with suitable bearings 26, in which is mounted a shaft 27 carrying upon one end a cam 28 which is engageable by a stationary pin 29 carried by the plate 22. A carriage 30 is pivotally mounted upon the shaft 27 and is preferably held against independent longitudinal movement by means of a collar 31 which is pinned to the shaft 27, as clearly shown in Figure 1. Mounted in the free end of the carriage 30 are the opposed lens clamping members 32 of any suitable or desirable form, one of which is actuated by means of a handle 33 operating against the action of the spring 34, as is well known by those skilled in the art. Suitable gearing 35 is mounted upon one end of the carriage to rotate the lens clamps 32 and the shaft 27 simultaneously, and it will be noted that as the shaft 27 is rotated it will be reciprocated by the action of the cam 28 engaging the pin 29, thereby carrying the carriage 30 and associated parts longitudinally of the machine. The gearing 35 consists of the gear 70 mounted on the lens clamp shaft 75, the idle 72 mounted on the carriage 30 and the gear 71 mounted on the shaft 27. A second gear 73 mounted on the shaft 27 is driven by the worm gear 74 by any source of power, not shown, and thereby transmits power to rotate the lens A in the lens clamps 32 on the lens clamp shaft 75.

The clamping member opposed to that which is operated by the handle 33 extends outwardly a short distance from the carriage and carries the pattern 36 which is suitably shaped to conform to the finished periphery of the lens to be ground and this pattern is readily detachable and replaceable by removing the thumb nut or the like 77 on the end of the shaft 75 so that any particular shape or size of lens may be operated upon by the use of any one of a series of patterns.

The plate or frame 22 has a rearwardly extending projection 37 which acts as a slideway for the arm 38 which has a slide projection thereon slidable within the slideway 37 and adjustable in and out by means of the screw member 39 which has a manual control 39ᴬ. At its extremity the arm 38 has a slot 40 which is normally parallel with the axis of the stone shaft and in which is slidable a block 41 which is pivoted at 76 to a contact shoe 42. The shoe 42 has a pair of angular surfaces 43 which are respectively parallel with the faces 17 of the abrasive wheel, and the pattern 36 is adapted to rest against the angled surfaces 43 in such a way that as the carriage 30 is reciprocated by the arm 28, the upper or lens supporting end of the carriage will be guided in and out by the pattern 36 to move the lens with relation to the angled faces of the stone so as to produce the desired bevel on the edge of the lens. Pressure is exerted on the lens during the grinding operation by a spring or weight as is usual in the prior art machines.

At the intersection of the two surfaces 43 a slight projection 43′ is formed, so that as the lens A passes the point 18 of the stone, the pattern 36 will ride over the projection 43′ and cause the lens to move away from the stone a slight amount to prevent the possible breakage of the lens as it is reciprocated from one angled face of the stone to the other.

The contact shoe 42 is carried by a bar 44 which is transversely slidable in an opening 45 of an adjustable bracket 46. The bracket 46 is provided preferably on its lower side with a dove-tailed sliding member 47 engageable within a stationary block 48 which is mounted on the base 15 of the machine. Adjusting mechanism 49, preferably a screw, is provided to move the block 46 longitudinally of the machine and it is equipped with the spiral gears 50 and 78 which actuates an indicating dial 51 so that the amount of movement will be indicated when the adjusting mechanism 49 is moved.

Any suitable driving mechanism 52 may be provided to impart motion to the gearing 35, and preferably a clutch 53 is used to disconnect the driving mechanism when desired, the mechanism 52 being connected at the rear of the machine by a flexible telescoping shaft 79 to the drive of the abrasive wheel the said flexible shaft having a universal joint and telescoping sections.

In use, the lens A is mounted in the clamping members 32 and the frame 22 is angularly adjusted about the pivot 23 in such a way that equal bevels will be ground upon both sides of the lens while the apex will be maintained in the center of the material. As the frame 22 is thus swung around, it carries the arm 38 with it, which in turn draws the contact shoe 42 forwardly, the block 41 sliding in the slot 40 to compensate for the arcuate movement of the arm 38. The adjusted position of the shoe 42 is illustrated by dotted lines in Figure 2, and it will be noticed that the distance from the peak 18 of the stone to the corresponding portion of the shoe is greater than the normal distance. The normal distance between these two elements should be equal to the distance between the center of the lens and the center of the pattern 36, and after the proper angular adjustment is made the bracket 46, carrying the shoe, is moved inwardly by means of the screw 49, in order to regain the said normal distance. When this suitable position is obtained the member 22 is locked by means of the locking member 24 and the clutch 53 thrown in whereupon the lens A is rotated simultaneously with and against the periphery of the abrasive wheel 16. At the same time the cam 28 is operating by virtue of the shaft 27 and the whole carriage 30 is reciprocating substantially longitudinally of the machine. The pattern 36 resting against one or the other of the faces 43 of the shoe 42 guides the free end of the carriage 30 in such a way that only a certain amount of material will be ground off the lens A and the lens will travel first up one surface 17 of the stone to bevel one side of the lens and then pass over the apex 18, and down the other side of the stone to bevel the other side of the lens in one continuous longitudinal movement right or left as will be clearly evident from a study of the drawings. In this form of the invention the size of the finished lens is controlled by adjustment of the screw 39, while the shape of the lens is controlled by the pattern 36.

Figure 4:
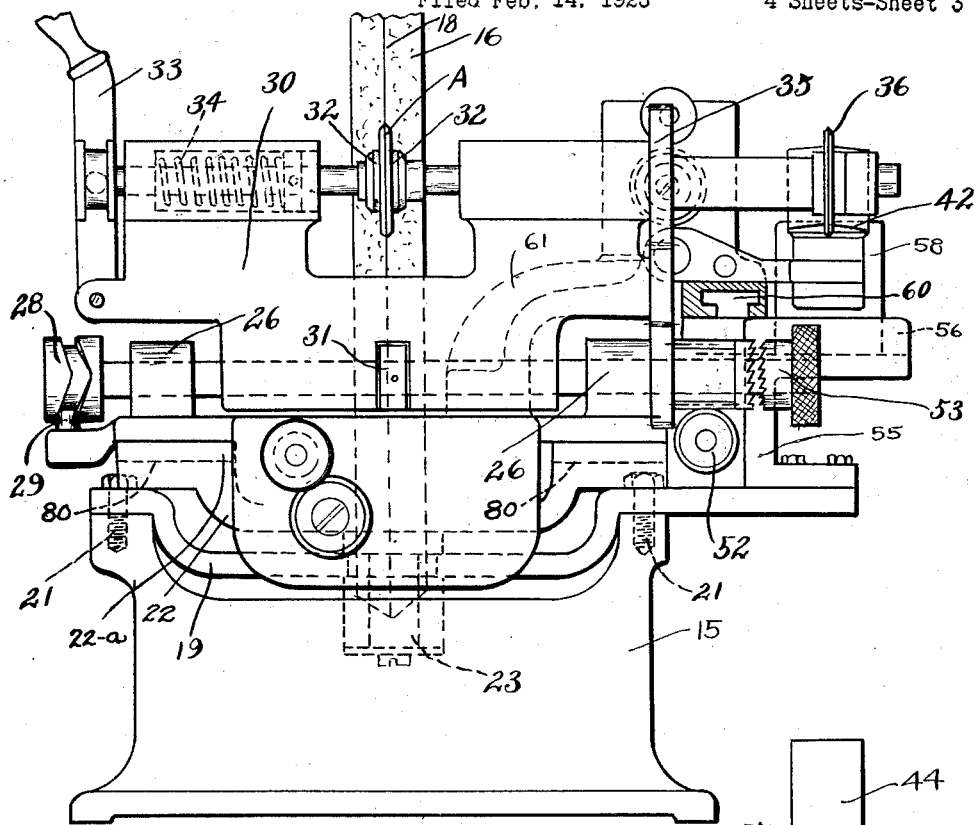
Figure 4 is a front elevation showing a modified construction.
Figure 5:
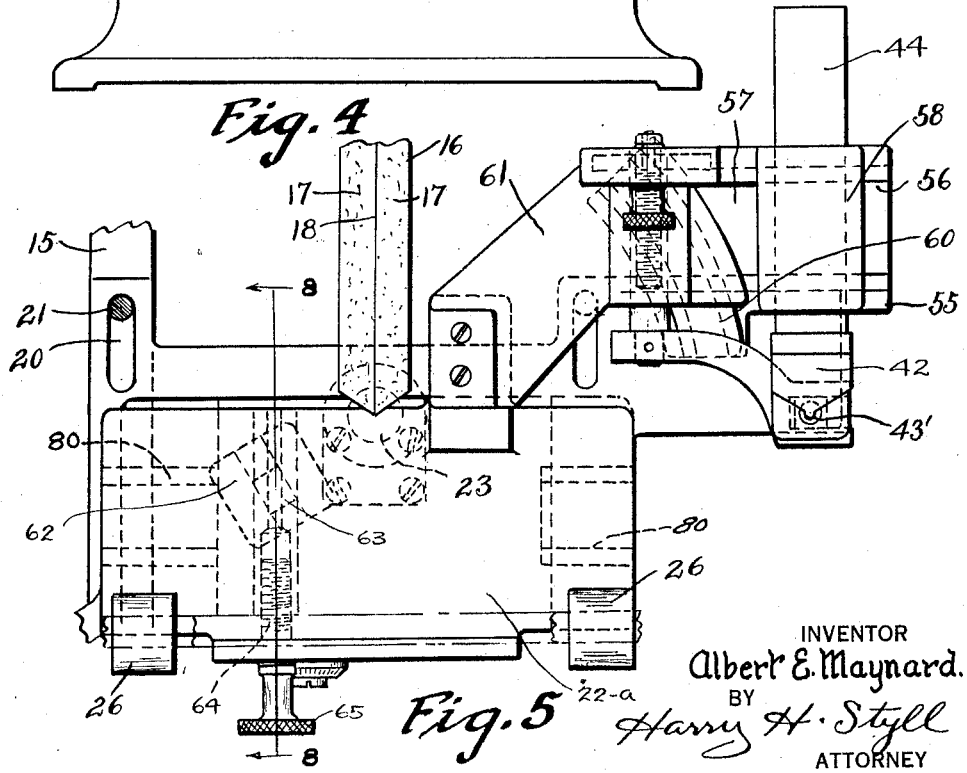
Figure 5 is a fragmentary top plan view thereof.
Figure 7:
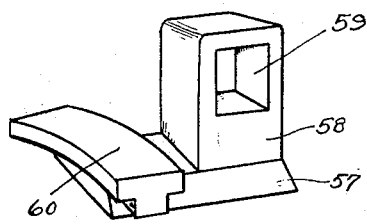
Figure 7 is a detail perspective view of the former shoe support.
Figure 8:
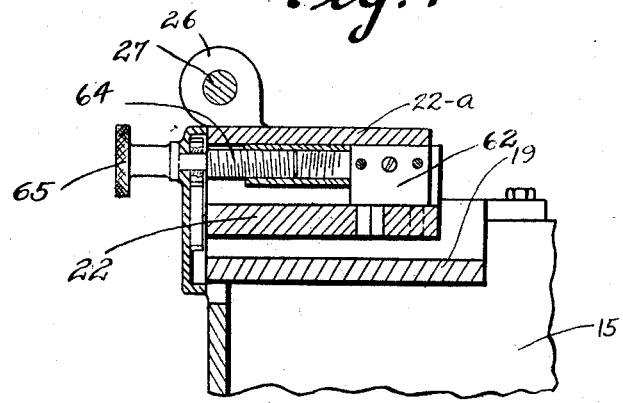
Figure 8 is a fragmentary transverse sectional view on line 8—8 of Figure 5.

In Figures 4 and 5, I have illustrated a modification wherein a stationary bracket 55 is mounted on the base 15, and is provided with a dove-tailed groove 56 wherein is slidable the bottom slide 57 of a guide bracket 58, shown in detail in Figure 7. This guide bracket 58 has an opening 59 wherein the bar 44 of the shoe is slidable, and at its other end the bottom slide 57 is provided with a T-shaped arcuated extension 60, best shown in Figure 7. A bracket 61 is carried by the plate 22$^a$ and has in its outer end a suitable groove adapted to slidably embrace the T-shaped extension 60 of the guide 57.

In order to adjust the frame 22$^a$ to compensate for the increased distance between the center of the stone and the center of the shoe 42, I may provide angularly disposed guide ways 62 in which is slidable a member 63 which is transversely operated by a screw 64. The plate 22$^A$ is slidably mounted on the plate 22 in the slideway 80 and the plate 22 is pivoted to the plate 19 at 23. Thus, as the screw 64 is rotated by means of the knob 65 the member 63 will be moved transversely of the carriage and the inclined plane action on the guides 62 will shift the frame 22$^a$ to either one side or the other, on the plate 22 to accurately position the former relative to the former shoe and the lens relative to the grindstone previous to the grinding of the bevels on both sides of the lens which are formed in one grinding operation by carrying the lens across one bevel on the face of the stone to form the bevel on one side of the lens and across the periphery of the stone and down the other bevel on the face of the stone to form the bevel on the other side of the lens.

Figure 6:
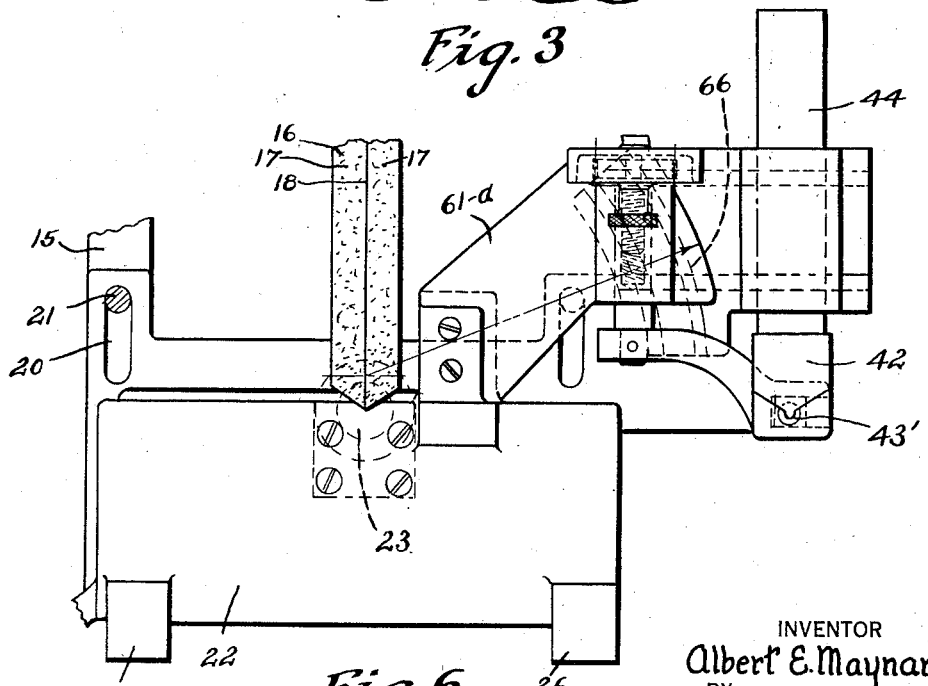
Figure 6 is a fragmentary top plan view of still another form of the invention.

In Figure 6, another modification is illustrated, wherein the independent adjustment of the carriage longitudinally to compensate for the angle, is done away with and taken care of automatically. This is accomplished by providing a bracket 61$^a$ having an arcuate slot 66, the center of whose radius is rearwardly disposed from the center of the pivot 23. The result of this offset is that it provides a cam action between the arcuate slot 66 and the T-shaped extension 60, so that as the carriage is adjusted angularly about the pivot 23, it will automatically move the former shoe longitudinally a proper amount to keep it in alignment with the former as the lens carriage is angled to properly position the periphery of the lens with the stone. The amount of the offset of the two centers above mentioned is sufficient to take care of the average range of lenses ordinarily handled by optical prescription shops.

Figures 9, 10, 11:
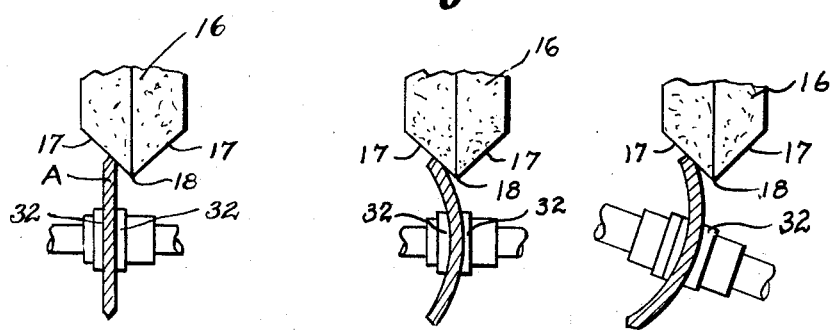
Figures 9, 10 and 11 are diagrammatic views illustrative of the edge grinding of different lenses.

By referring now to Figures 9 to 13 inclusive, the importance of the invention may be more fully appreciated. In Figure 9 a flat lens A is shown in the clamps 32, being operated upon by the stone 16. Here the axis of the lens holder is parallel to the axis of the stone, and, because an equal amount of grinding is done by each surface 17 of the stone, the two bevels produced upon the lens will be equal in length and equi-angular to the two lens surfaces. Such a lens is properly ground and can be well fitted in a standard lens frame.

Considering curved lenses, such as oval, toric and meniscus, it will be seen that conditions are different. In Figure 10 such a lens is illustrated, being ground with its axis held parallel with the axis of the stone, the apex of the bevel being kept in the center of the edge. The result, as shown in Figure 12, is that one bevel is longer than the other; therefore it does not properly fit into a lens frame.

Figures 12, 13:
Figures 12 and 13 are fragmentary sectional views of lenses showing their application in lens frames.

The improved method and result is shown in Figures 11 and 13. Here the mean curve of the lens surfaces is estimated and the carriage adjusted so that its axis will be at an angle to the stone axis. The result is that both bevels will be substantially equi-angular to the adjacent lens surfaces, and they will also be equal in length. In placing such a lens within a standard lens frame, it will be well seated, as clearly shown in Figure 13.

From the foregoing it will be obvious that I have produced an improved lens edging machine which will be simple in construction, strong and durable in service, efficient in operation and an improvement in the art. Obviously changes may be resorted to in the minor details of construction, combination, and arrangement of parts, and the right is herein reserved to make such changes falling within the scope of the appended claim without departing from the spirit of the invention.

I claim:

In a device of the character described, a base, a rotatable grinding wheel mounted on the base and having a double bevelled edge with the apex of the bevel forming the periphery of the grinding wheel, a support pivoted on the base to swing transversely to the plane of the grinding wheel in the plane of the axis of said wheel and about an axis tangent to the peripheral apex, a lens holding spindle rotatably mounted on said support to swing in the plane of the grinding wheel toward and away therefrom, means for oscillating the lens holding spindle longitudinally, a lens former shape on the lens holding spindle and rotatable and movable longitudinally therewith, a slidable contact shoe having a contact face corresponding with the face of the grinding wheel and guided on the base to maintain its parallel relation to the grinding wheel, means on the swinging support engaging the shoe to slide the same as the support is swung on its pivot to follow the former and means to adjust the shoe to compensate for the change in relationship of the former and shoe due to the swinging of the support.

ALBERT E. MAYNARD.